United States Patent
Yamanaka et al.

(10) Patent No.: US 9,120,397 B2
(45) Date of Patent: Sep. 1, 2015

(54) ATTACHMENT STRUCTURE OF WEIGHT SENSOR FOR SEAT OCCUPANT DETECTION

(71) Applicant: DENSO CORPORATION, Kariya, Aichi-pref. (JP)

(72) Inventors: Shoichi Yamanaka, Anjo (JP); Takashi Inoue, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/195,009

(22) Filed: Mar. 3, 2014

(65) Prior Publication Data

US 2014/0250642 A1 Sep. 11, 2014

(30) Foreign Application Priority Data

Mar. 8, 2013 (JP) .................. 2013-046874

(51) Int. Cl.
  *A47C 7/72* (2006.01)
  *B60N 2/00* (2006.01)
  *B60N 2/58* (2006.01)
  *A47C 7/62* (2006.01)

(52) U.S. Cl.
  CPC .............. *B60N 2/002* (2013.01); *B60N 2/5816* (2013.01); *B60N 2/5825* (2013.01); *A47C 7/62* (2013.01); *A47C 7/72* (2013.01); *Y10T 24/44* (2015.01)

(58) Field of Classification Search
  CPC ..................................... A47C 7/72; A47C 7/62
  USPC ........... 297/217.1–217.7, 218.1–218.5, 452.6
  See application file for complete search history.

(56) References Cited

U.S. PATENT DOCUMENTS

| 4,549,334 A * | 10/1985 | Miller .............................. 29/278 |
| 7,901,002 B2 * | 3/2011 | Mashimo .................... 297/218.3 |
| 8,814,267 B2 * | 8/2014 | Welch et al. ............... 297/218.4 |
| 2002/0093236 A1 * | 7/2002 | Inoue ....................... 297/452.48 |

FOREIGN PATENT DOCUMENTS

| EP | 2 517 926 | 10/2012 |
| EP | 2 517 927 | 10/2012 |
| EP | 2 543 539 | 1/2013 |
| JP | 04-084040 | 7/1992 |
| JP | 04-084042 | 7/1992 |
| JP | 2002-211297 | 7/2002 |

OTHER PUBLICATIONS

Office Action dated Jan. 22, 2015 in corresponding Japanese Application No. 2013-046874.

* cited by examiner

*Primary Examiner* — Syed A Islam
(74) *Attorney, Agent, or Firm* — Harness, Dickey & Pierce, PLC

(57) ABSTRACT

An attachment structure of a weight sensor for seat occupant detection includes an insert member extending from a skin member of a seat portion into a concave groove provided on a pad member of the seat portion, and at least one connection member connected to an end part of the insert member inside the concave groove. An opening part is provided in the insert member, and the weight sensor inserted in the insert member through an opening of the opening part across the concave groove.

10 Claims, 3 Drawing Sheets

ATTACHMENT STRUCTURE OF WEIGHT SENSOR FOR SEAT OCCUPANT DETECTION

CROSS REFERENCE TO RELATED APPLICATION

This application is based on and incorporates herein by reference Japanese Patent Application No. 2013-046874 filed on Mar. 8, 2013.

TECHNICAL FIELD

The present disclosure relates to an attachment structure of a weight sensor that is attached to a seat of a vehicle to detect seating state of a person.

BACKGROUND

Conventionally, there is a technology to detect a state in which a person sits on a vehicle seat and to control a variety of safety devices such as a seatbelt or an airbag installed in a vehicle in order to improve performances of these safety devices. A film-like membrane switch having flexibility can be used as a weight sensor suitable for detecting such a seating state of a person. A seat portion and a backrest portion of the vehicle seat are generally obtained by covering a pad made of urethane or the like with a skin member such as fabric, synthetic leather or leather. More specifically, the skin member is inserted into a concave groove provided on a surface of the pad, and the inserted skin member is fixed to an anchor member (e.g. wire or resin rod) disposed adjacent to the concave groove by using a fixing tool (fixing ring). Accordingly, the skin member fits to the geometry of the surface of the pad.

Since the concave groove is located most often on a seated part of the pad (i.e. the seat portion) in the vehicle seat, a conduction portion of the weight sensor (membrane switch), which is located between detection portions of the weight sensor and conveys signals of the detection portions, extends across the concave groove. When the conduction portion is fixed and attached to the vehicle seat across the concave groove, a load on the vehicle seat may cause deformation and breaking of the conduction portion with deformation of the concave groove. Thus, the conduction portion is loosely provided in a part of the concave groove in order to prevent the breaking, and a loose part of the conduction portion is arranged inside the concave groove. However, when a person sits on the vehicle seat, the concave groove is compressed in its depth direction, in other words, the depth of the concave groove becomes low. Accordingly, the loosed part of the conduction portion may be bent extremely or be in contact strongly with another loose part. Repetition of such state may cause breaking of the conduction portion of the weight sensor.

For example, Patent Document 1 (JP 2002-211297 A corresponding to US 2002/0093236 A1) discloses a technology to prevent such breaking of a conduction portion. The technology of Patent Document 1 relates to an attachment structure of a seat sensor that is inserted between a foam and a skin of a seat on that a person sits, and detects a load on the seat. A signal line of the seat sensor extends across a concave groove provided on the foam. A wire attached to the skin extends through the concave groove, and the signal line of the seat sensor extends under the wire. A part of the concave groove overlapping with the signal line is formed to have a relatively deep bottom surface, thereby providing a deep groove part. The wire provided in the foam along the concave groove is removed from the deep groove part, and a folded portion of the signal line is arranged in the deep groove part in such a way as to have flexibility.

In Patent Document 1, the signal line is elongated to the deep groove part having a relatively deep bottom and bypasses a suspended bag. Therefore, the signal line may become long excessively, and a cost of the sensor may thereby increase. Additionally, attachment work of the sensor to the seat may become difficult.

SUMMARY

It is an objective of the present disclosure to provide an attachment structure of a weight sensor for seat occupant detection, in which the weight sensor can be reduced in cost and be easily attached to a seat portion.

According to an aspect of the present disclosure, in an attachment structure of a weight sensor for seat occupant detection, the weight sensor is inserted into between a pad member and a skin member of a seat portion on that a person sits, and the weight sensor extends across a concave groove provided on the pad member. The attachment structure includes an insert member, at least one connection member and an opening part. The insert member extends from the skin member into the concave groove, and the insert member includes a first end part connected to the skin member and a second end part opposite to the first end part. The connection member is connected to the second end part of the insert member inside the concave groove. The opening part is provided in the insert member, and the weight sensor inserted in the insert member through an opening of the opening part.

According to the present disclosure, since the weight sensor extends in the insert member through the opening of the opening part between the skin member and the connection member, a dimension of the weight sensor in the longitudinal direction of a conduction portion can be reduced. There is no need to use a weight sensor excessively long. Therefore, a cost of the weight sensor can be reduced, and attachment of the weight sensor to the seat portion can be facilitated.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
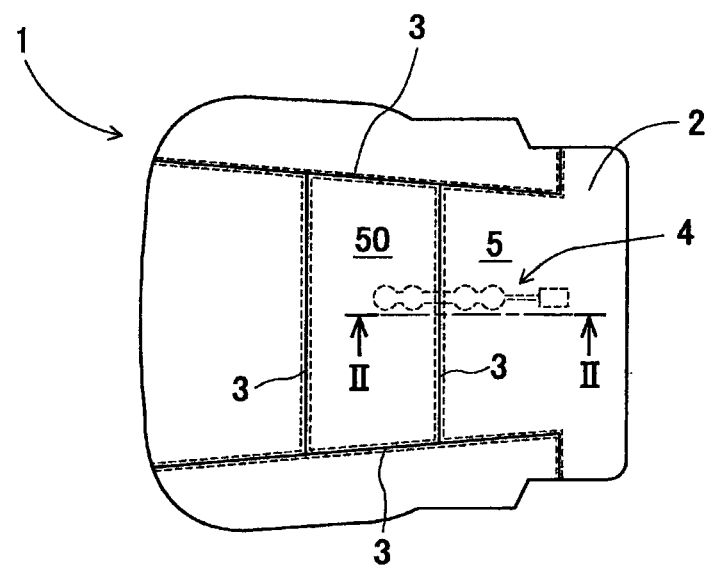
FIG. 1 is a top view showing a seat portion according to first to third embodiments of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination. Reduction scales of the drawings, especially sectional diagrams, may be changed.

First Embodiment

Figure 2:
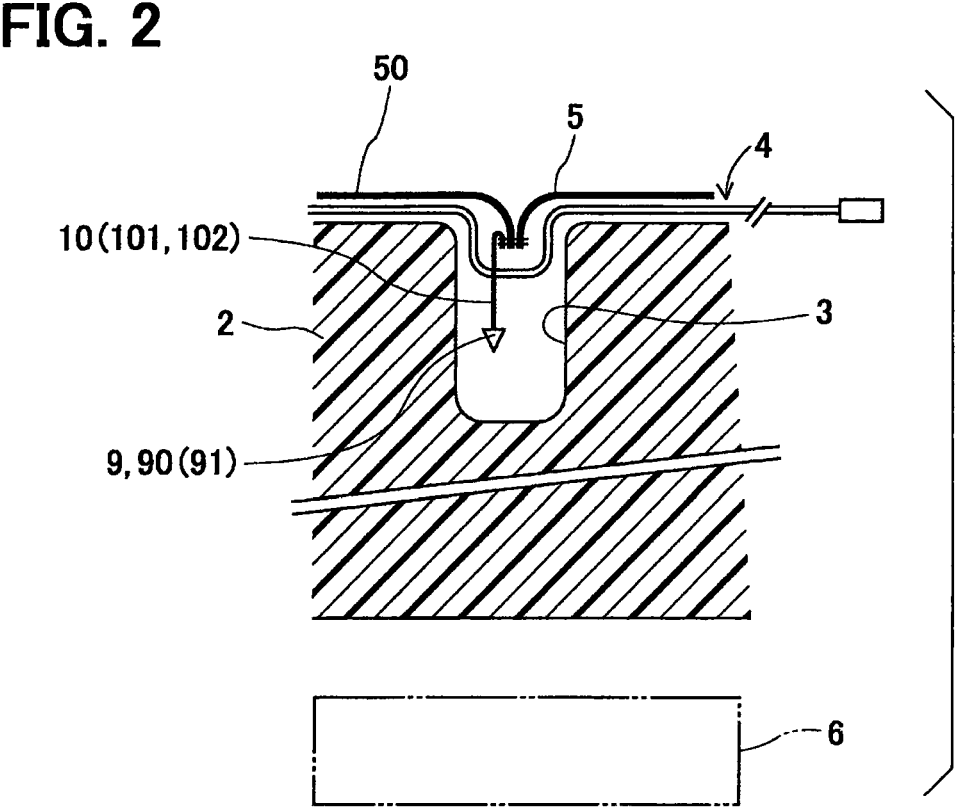
FIG. 2 is a sectional diagram taken along a line II-II of FIG. 1.

As shown in FIGS. 1 and 2, a seat portion 1 of a vehicle includes a pad member 2, skin members 5 and 50, and a weight sensor 4. The pad member 2 is made of urethane for example, and has cushioning properties to be used as a base body of a seat. The skin members 5 and 50 are made of fabric, synthetic leather or leather and enclose an upper surface and a side surface of the pad member 2. The weight sensor 4 is interposed between the pad member 2 and the skin member 5.

The upper surface of the pad member 2 has multiple concave grooves 3, and the skin members 5 and 50 are pulled into the concave grooves 3 to fit the geometry of the surfaces of the pad member 2. The skin members 5 and 50 are pulled by using an insert member 10, connection members 9 and 90, and a non-shown fixing tool for the connection members 9 and 90. A method of pulling the skin members 5 and 50 into the concave groove 3 will be described below. A passage may be provided on a bottom surface of the pad member 2 to guide air blown by a fan 6 located below the pad member 2 toward a front side (left side in FIGS. 1 and 2) of the seat portion 1.

Figure 3:
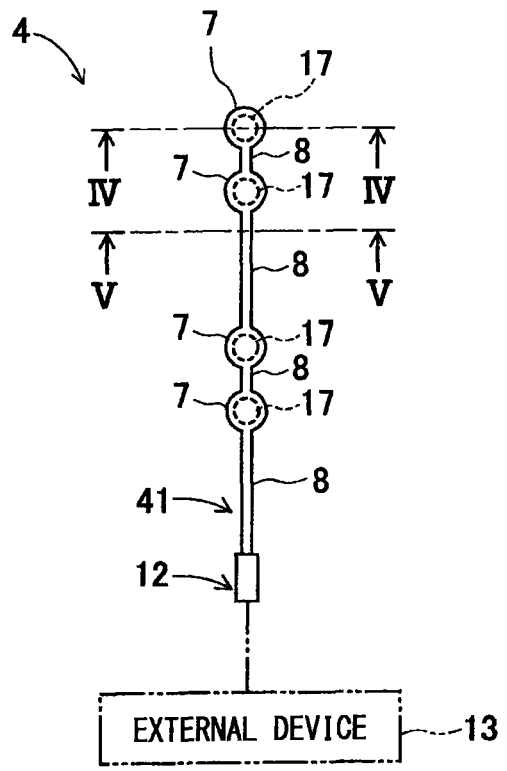
FIG. 3 is a schematic diagram showing a weight sensor according to the first to third embodiments.
Figure 4:
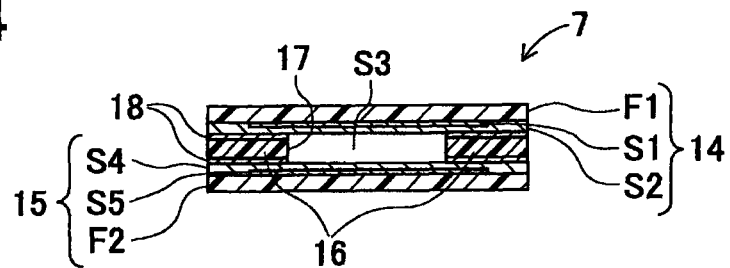
FIG. 4 is a sectional diagram taken along a line IV-IV of FIG. 3.
Figure 5:
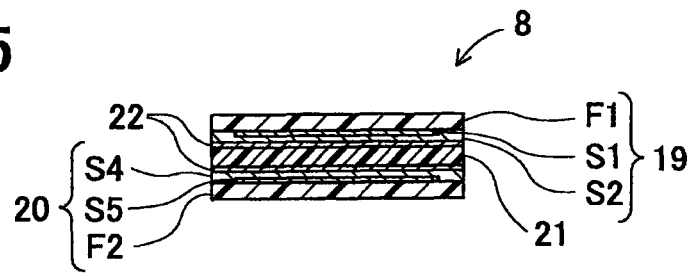
FIG. 5 is a sectional diagram taken along a line V-V of FIG. 3.

As shown in FIGS. 3 to 5, the weight sensor 4 includes detection portions 7 in each of which a first film 14 and a second film 15 combined each other, conduction portions 8 in each of which a first film 19 and a second film 20 are combined each other, a connector 12 and a wire.

As shown in FIG. 4, the detection portion 7 includes the first film 14, the second film 15, a spacer 16 and a bond 18.

The first film 14 has a flat film shape and is made mainly of flexible resin such as polyethylene naphthalate: PEN. The first film 14 includes a silver layer S1 on which silver (Ag) of conductive material is printed, a carbon layer S2 on which carbon (C) is printed, and a cover layer F1. The carbon layer S2 covers one side of the silver layer S1, and the cover layer F1 covers the other side of the silver layer S1 and the carbon layer S2. In other words, the first film 14 includes the cover layer F1 and a first conduction layer consisting of the silver layer S1 and the carbon layer S2.

Similar to the first film 14, the second film 15 has a flat film shape and is made mainly of flexible resin such as polyethylene naphthalate: PEN. The second film 15 includes a silver layer S5 on which silver (Ag) of conductive material is printed, a carbon layer S4 on which carbon (C) is printed, and a cover layer F2. The carbon layer S4 covers one side of the silver layer S5, and the cover layer F2 covers the other side of the silver layer S5 and the carbon layer S4. In other words, the second film 15 includes the cover layer F2 and a second conduction layer consisting of the silver layer S5 and the carbon layer S4.

The spacer 16 has a flat shape and is made of flexible and insulating resin such as polyethylene terephthalate: PET. The spacer 16 is arranged between the carbon layer S2 of the first film 14 and the carbon layer S4 of the second film 15. The spacer 16 has a loop shape (doughnut shape) in its top view. In other words, the spacer 16 has a through portion 17 in an approximately center part of the detection portion 7 as shown in FIG. 3. The through portion 17 is provided by creating a hole extending through the spacer 16 in an approximately center part of the spacer 16 in an up-down direction of the spacer 16 in FIG. 4. The through portion 17 provides a space layer S3 between the first conduction layer and the second conduction layer.

The bond 18, which is an adhesive, bonds the carbon layer S2 of the first film 14 and one side of the spacer 16 and bonds the carbon layer S4 of the second film 15 and the other side of the spacer 16. An acrylic adhesive is used as the bond 18 in the present embodiment.

The conduction portions 8 are parts of a sensor body 41 other than the detection portions 7. More specifically, the conduction portions 8 are wiring parts electrically connecting adjacent two of the detection portions 7 or electrically connecting the detection portion 7 and the connector 12. As shown in FIG. 5, each of the conduction portions 8 includes the first film 19, the second film 20, a spacer 21 and a bond 22. When the sensor body 41 is attached to the pad member 2, the conduction portion 8 is arranged in the concave groove 3.

The first film 19 has a flat film shape and is made mainly of flexible resin such as polyethylene naphthalate: PEN. The first film 19 is integrated with the first film 14 of the detection portion 7. Therefore, the first films 14 and 19 constitute a single film.

The first film 19 includes a silver layer S1 on which silver (Ag) of conductive material is printed, a carbon layer S2 on which carbon (C) is printed, and a cover layer F1. The carbon layer S2 covers one side of the silver layer S1, and the cover layer F1 covers the other side of the silver layer S1 and the carbon layer 52. In other words, similar to the first film 14 of the detection portion 7, the first film 19 includes the cover layer F1 and a first conduction layer consisting of the silver layer S1 and the carbon layer S2.

The second film 20 has a flat film shape and is made mainly of flexible resin such as polyethylene naphthalate: PEN. The second film 20 is integrated with the second film 15 of the detection portion 7. Therefore, the second films 15 and 20 constitute a single film.

The second film 20 includes a silver layer S5 on which silver (Ag) of conductive material is printed, a carbon layer S4 on which carbon (C) is printed, and a cover layer F2. The carbon layer S4 covers one side of the silver layer S5, and the cover layer F2 covers the other side of the silver layer S5 and the carbon layer S4. In other words, similar to the second film 15 of the detection portion 7, the second film 20 includes the cover layer F2 and a second conduction layer consisting of the silver layer S5 and the carbon layer S4.

The spacer 21 has a flat shape, similar to the films 19 and 20, and is made of flexible and insulating resin such as polyethylene terephthalate: PET. The spacer 21 is arranged between the carbon layer S2 of the first film 19 and the carbon layer S4 of the second film 20. The spacer 21 does not provide a through portion, in other words, the conduction portion 8 does not have a space layer, unlike with the detection portion 7. The spacer 21 is integrated with the spacer 16. Thus, the spacers 16 and 21 constitute a single component.

The bond 22 bonds the first film 19 and one side of the spacer 21, and bonds the second film 20 and the other side of the spacer 21. In the present embodiment, an acrylic adhesive is used as the bond 22, similar to the bond 18.

The connector 12 is connected to one end part of the sensor body 41 and is electrically connected to an external device 13 such as an electronic control unit: ECU or a seat-belt buckle switch. One end of the sensor body 41 is fixed to the connector 12, and the detection portion 7 is located in the other end of the sensor body 41. A longitudinal direction of the sensor body 41 is directed from the one end to the other end of the sensor body 41 (or from the other end to the one end of the sensor body 41).

When a person sits on the seat portion 1 of the vehicle, the first film 14 is pressed downward and the second film 15 is pressed upward in FIG. 4. The carbon layer S2 of the first conduction layer and the carbon layer S4 of the second conduction layer are in contact with each other in the space layer S3. Accordingly, the first conduction layer (S1 and S2) and the second conduction layer (S4 and S5) are electrically connected to each other, and conducting (ON) information is send to the external device 13 through the connector 12. Accordingly, the weight sensor 4 is capable of detecting the seating of the person.

In the present embodiment, the detection portions 7 of the sensor body 41 are arranged in a linear manner as shown in FIG. 3. Alternatively, the conduction portions 8 may be branched, and the detection portions 7 may be arranged in a branched manner. The number of the detection portions 7 and distances between the detection portions 7 may be set depending on a shape or size of the seat portion 1.

Figure 6:
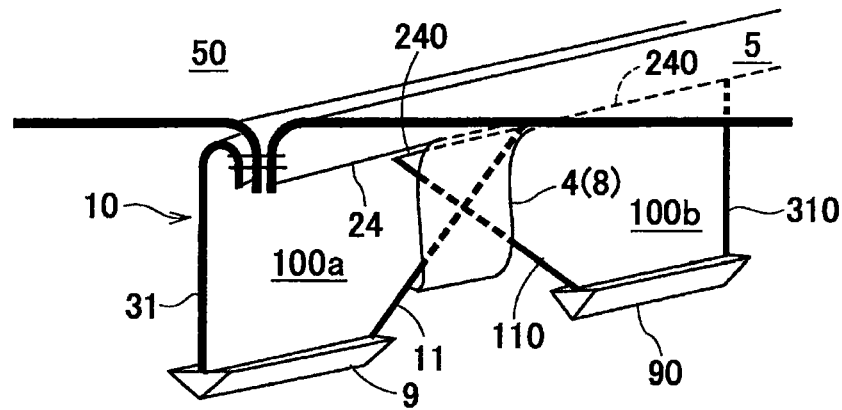
FIG. 6 is a schematic perspective diagram showing an inside of a concave groove according to the first embodiment.

As shown in FIGS. 2 and 6, an end part of the skin member 5 and an end part of the skin member 50 are coupled together with an end part of the insert member 10 in a center part of an opening of the concave groove 3, thereby providing a coupled line 24 between the skin member 5, 50 and the insert member 10. More specifically, the insert member 10 consists of a first insert part 100a and a second insert part 100b which are separately connected to the skin member 5. Edges of the skin members 5 and 50 and an edge of the first insert part 100a are aligned in the same line that is the coupled line 24. The edges of the skin members 5 and 50 and an edge of the second insert part 100b are aligned in the same line that is the coupled line 240. The insert parts 100a and 100b are made of fabric for example, and may have a bag shape. The insert member 10 may be suspended from the end parts of the skin members 5 and 50 into the concave groove 3. The end part of the insert member 10 may be folded, and a side of the end part may be connected to a side of the end part of the skin member 5 or 50.

A side of the first insert part 100a opposite from the coupled line 24 is connected to a connection member 9. A side of the second insert part 100b opposite from the coupled line 240 is connected to a connection member 90. The connection members 9 and 90 may have rod shapes or may be, for example, resin rods or metal wires. When the insert parts 100a and 100b have bag shapes, the connection members 9 and 90 are inserted into the insert parts 100a and 100b. The first insert part 100a includes a cut side 11 at an obtuse angle with the side connected to the connection member 9, and the cut side 11 is connected to one end of the connection member 9 opposed to one end of the connection member 90. The first insert part 100a further includes a cut side 31 at a right angle with the side connected to the connection member 9, and the cut side 31 is connected to the other end of the connection member 9 opposite from the connection member 90. On the other hand, the second insert part 100b includes a cut side 110 at an obtuse angle with the side connected to the connection member 90, and the cut side 110 is connected to the one end of the connection member 90 opposed to the one end of the connection member 9. The second insert part 100b further includes a cut side 310 at a right angle with the side connected to the connection member 90, and the cut side 310 is connected to the other end of the connection member 90 opposite from the connection member 9. The connection members 9 and 90 may be suspended from the skin member 5 and 50 together with the insert member 10.

Therefore, a length of the coupled line 24 is longer than a length of the side of the first insert part 100a connected to the connection member 9. A length of the coupled line 240 is longer than a length of the side of the second insert part 100b connected to the connection member 90. An opening defined between the cut side 11 of the first insert part 100a and the cut side 110 of the second insert part 100b has a triangular shape. An end of the opening, i.e. a side of the triangular shape is located between the connection members 9 and 90. A cross point between the cut side 11 and the cut side 110 may not exist when the corner angle of the first insert part 100a between the cut side 11 and the side connected to the connection member 9 is near to a right angle, and when the corner angle of the second insert part 100b between the cut side 110 and the side connected to the connection member 90 is near to a right angle. The cross point between the cut side 11 and the cut side 110 may not exist also when a distance between the one end of the connection member 9 and the one end of the connection member 90 is large. Moreover, in these cases, the opening defined between the cut sides 11 and 110 may not have a triangular shape. When the opening defined between the cut sides 11 and 110 has a triangular shape, the skin members 5 and 50 can be pulling into the concave groove 3 more effectively by using the connection members 9 and 90. The conduction portion 8 of the weight sensor 4 extends through the opening defined between the cut sides 11 and 110. The cut sides 11 and 110 may be used as an opening part provided in the insert member 10, and the weight sensor 4 may be inserted in the insert member 10 through an opening of the opening part.

Second Embodiment

Figure 7:
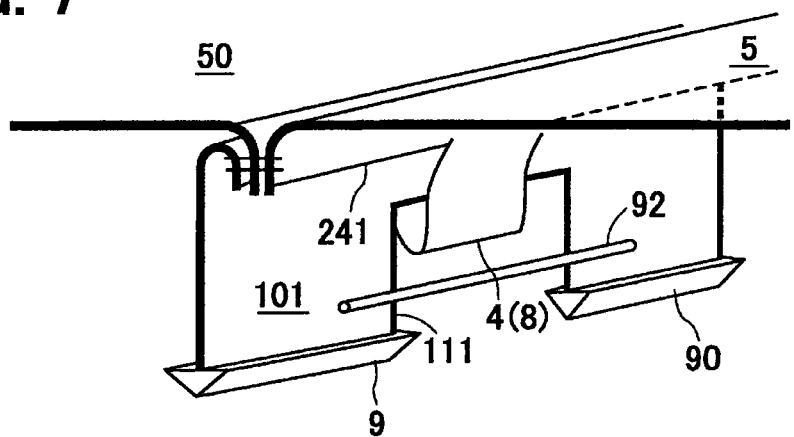
FIG. 7 is a schematic perspective diagram showing an inside of a concave groove according to the second embodiment.

As shown in FIGS. 2 and 7, an end part of a skin member 5 and an end part of a skin member 50 are coupled together with an end part of an insert member 101 in a center part of an opening of a concave groove 3, thereby providing a coupled line 241 between the skin member 5, 50 and the insert member 101. More specifically, sides of the end parts of the skin members 5 and 50 and a side of the end part of the insert member 101 are aligned in the same line that is the coupled line 241. The insert member 101 is made of fabric for example, and may have a bag shape.

The insert member 101 has an opening part 111 on an opposite side of the insert member 101 with respect to the coupled line 241. The opening part 111 has a rectangular opening that opens on both sides of the insert member 101 and communicates with an exterior space on the opposite side of the insert member 101 with respect to the coupled line 241. Hence, the opposite side of the insert member 101 with respect to the coupled line 241 is separated into two sides by the rectangular opening of the opening part 111, and the two sides of the insert member 101 are connected to connection members 9 and 90, respectively. The connection members 9 and 90 may be, for example, resin rods or metal wires. When the insert member 101 has a bag shape, the connection members 9 and 90 are inserted into the insert member 101. The shape of the opening of the opening part 111 is not limited to the rectangular shape, but may be a triangular shape and communicate with the exterior space on the opposite side of the insert member 101 with respect to the coupled line 241, similar to the first embodiment. In either case of the opening shape of the opening part 111, a length of the coupled line 241 is longer than a sum of lengths of the two sides of the insert member 101 connected to the connection members 9 and 90.

A conduction portion 8 of a weight sensor 4 extends through the opening of the opening part 111.

When the opening of the opening part 111 has the rectangular shape, a force pulling the skin members 5 and 50 into the concave groove 3 may be weak at a position corresponding to the opening part 111 of the insert member 101. In order to compensate for the weak force, an auxiliary insert member 92 is used in the present embodiment. The auxiliary insert member 92 connects a part of the insert member 101 connected to the connection member 9 and a part of the insert member 101 connected to the connection member 90 across the opening of the opening part 111. The auxiliary insert member 92 may be a resin rod or a metal wire, for example. The auxiliary insert member 92 is fixed to the insert member 101 by an appropriate method. The auxiliary insert member 92 is provided below the weight sensor 4 as shown in FIG. 7, but the auxiliary insert member 92 may be provided above the weight sensor 4.

Third Embodiment

Figure 8:
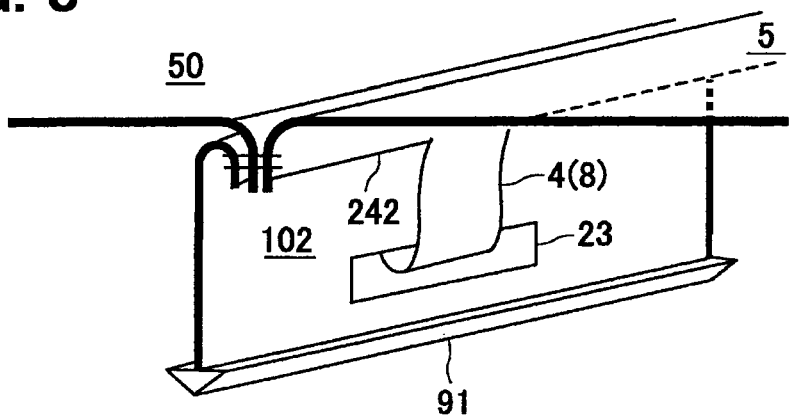
FIG. 8 is a schematic perspective diagram showing an inside of a concave groove according to the third embodiment.

As shown in FIGS. 2 and 8, an end part of a skin member 5 and an end part of a skin member 50 are coupled together with an end part of an insert member 102 in a center part of an opening of a concave groove 3, thereby providing a coupled line 242 between the skin member 5, 50 and the insert member 102. More specifically, sides of the end parts of the skin members 5 and 50 and a side of the end part of the insert member 102 are aligned in the same line that is the coupled line 242. The insert member 102 is made of fabric for example, and may have a bag shape.

An opposite side of the insert member 102 with respect to the coupled line 242 is connected to a connection member 91. The connection member 91 may be, for example, a resin rod or a metal wire. When the insert member 102 has a bag shape, the connection member 91 is inserted into the insert member 102. The insert member 102 has a rectangular shape, and the insert member 102 includes an opening part 23 having a rectangular opening. A conduction portion 8 of a weight sensor 4 extends through the rectangular opening of the opening part 23.

As is clear from the above description, an attachment structure of the weight sensor 4 for seat occupant detection according to the first to third embodiments includes the insert member 10, 101, 102 extending from the skin member into the concave groove. The insert member 10, 101, 102 includes a first end part connected to the skin member, and a second end part opposite to the first end part. The attachment structure further includes at least one connection member 9, 90, 91 connected to the second end part of the insert member 10, 101, 102 inside the concave groove, and the opening part 11, 110, 111, 23 provided in the insert member 10, 101, 102. The weight sensor is inserted in the insert member 10, 101, 102 through the opening of the opening part 11, 110, 111, 23.

Since the weight sensor 4 is inserted in the insert member 10, 101, 102 through the opening of the opening part 11, 110, 111 between the coupled line 24, 240, 241, 242 and the connection member 9, 90, a dimension of the weight sensor 4 in the longitudinal direction of the conduction portion 8 can be reduced. There is no need to use a weight sensor excessively long. Therefore, a cost of the weight sensor 4 can be reduced, and attachment of the weight sensor 4 to the seat portion 1 can be facilitated.

A pair of the connection members 9, 90 may be connected to the second end part of the insert member 10, 101 along a length smaller than a length of the first end part of the insert member 10, 101 in a direction along the concave groove 3. The opening of the opening part 11, 110, 111 may open from the insert member 10, 101 between the connection members 9, 90.

Alternatively, a pair of the connection members 9, 90 may be connected to the second end part of the insert member 10, and the opening of the opening part 11, 110 may open from the insert member 10 between the connection members 9, 90. The insert member 10 may include the first insert part 100a having a skin-side part connected to the skin member and a groove-side part connected to one of the connection members 9, 90. The skin-side part may be longer than the groove-side part in the direction along the concave groove 3 in the first insert part 100a. The insert member 10 may further include a second insert part 100b having a skin-side part connected to the skin member and a groove-side part connected to the other of the connection members 9, 90. The skin-side part is longer than the groove-side part in the direction along the concave groove 3 in the second insert part 100b. The first insert part 100a and the second insert part 100b may define the opening of the opening part 11, 110 between the first insert part 100a and the second insert part 100b. In this case, the skin members 5, 50 can be pulled into the concave groove 3 effectively and evenly with compensating for partial reduce of the pulling force caused by a clearance between the two connection members 9, 90 that are separated from each other.

The opening of the opening part 11, 110, 111 may have a triangular shape, and the end of the opening between the two connection members 9, 90 may correspond to a side of the triangular shape. Therefore, the skin members 5, 50 can be pulled effectively and evenly.

The auxiliary insert member 92 may be provided to connect the part of the insert member 101 connected to one of the two connection member 9, 90 and the part of the insert member 101 connected to the other of the two connection members 9, 90 across the opening of the opening part 111. Accordingly, the skin members 5, 50 can be pulled into the concave groove 3 effectively and evenly with compensating for partial reduce of the pulling force caused by a clearance between the two connection members 9, 90 that are separated from each other.

The opening of the opening part 23 may be enclosed by the insert member 102. Accordingly, the skin members 5, 50 can be pulled into the concave groove 3 effectively and evenly.

The present disclosure includes other attachment structures feasible in embodiments modified, corrected or improved based on knowledge of a person skilled in the art. The modified embodiment of the present disclosure is included in the scope of the present disclosure unless the modified embodiment departs from the meaning of the present disclosure.

For example, in the above-described embodiments, the detection portion 7 is a membrane on-off switch. Alternatively, the detection portion 7 may be a weight sensor using a pressure-sensitive ink, a piezoelectric element, or strain gage. Alternatively, the detection portion 7 may be a capacitance sensor that detects whether a person sits on or detects a size of an occupant based on change of electrostatic capacitance. In the above-described embodiments, the total number of the detection portions 7 arranged is four, but the number of the arranged detection portions 7 is not limited especially. Also, the number and location of the concave grooves 3 is not limited particularly.

Additional advantages and modifications will readily occur to those skilled in the art. The disclosure in its broader terms is therefore not limited to the specific details, representative apparatus, and illustrative examples shown and described.

What is claimed is:

1. An attachment structure of a weight sensor for seat occupant detection, in which the weight sensor is inserted into between a pad member and a skin member of a seat portion on that a person sits, the weight sensor extending across a concave groove provided on the pad member, the attachment structure comprising:
   an insert member extending from the skin member into the concave groove, the insert member including a first end part connected to the skin member, and a second end part opposite to the first end part;
   at least one connection member connected to the second end part of the insert member inside the concave groove;
   an opening part provided in the insert member; and
   an inserted part of the weight sensor inserted through an opening of the opening part and positioned between the skin member and the at least one connection member in a depth direction of the concave groove.

2. The attachment structure according to claim 1, wherein a pair of the connection members is connected to the second end part of the insert member along a length smaller than a length of the first end part of the insert member in a direction along the concave groove, and
   the opening of the opening part opens from the insert member between the connection members.

3. The attachment structure according to claim 1, wherein a pair of the connection members is connected to the second end part of the insert member,
   the opening of the opening part opens from the insert member between the connection members,
   the insert member includes:
      a first insert part having a skin-side part connected to the skin member and a groove-side part connected to one of the connection members, wherein the skin-side part is longer than the groove-side part in the direction along the concave groove; and
      a second insert part having a skin-side part connected to the skin member and a groove-side part connected to the other of the connection members, wherein the skin-side part is longer than the groove-side part in the direction along the concave groove, and
   the first insert part and the second insert part define the opening of the opening part between the first insert part and the second insert part.

4. The attachment structure according to claim 3, wherein the opening of the opening part has a triangular shape.

5. The attachment structure according to claim 2, further comprising an auxiliary insert member connecting a part of the insert member connected to one of the connection members and a part of the insert member connected to the other of the connection members across the opening of the opening part.

6. The attachment structure according to claim 1, wherein the opening of the opening part is enclosed by the insert member.

7. The attachment structure according to claim 3, wherein the first insert part and the second insert part are overlapped with each other between the skin member and the inserted part of the weight sensor.

8. The attachment structure according to claim 3, wherein an edge of the skin-side part of the first insert part, an edge of the skin-side part of the second insert part and an edge of the skin member are aligned with each other.

9. The attachment structure according to claim 3, wherein
   the first insert part includes a first cut side at an obtuse angle with the groove-side part and a second cut side opposite the first cut side at a right angle with the groove-side part; and
   the second insert part includes a first cut side at an obtuse angle with the groove-side part and a second cut side opposite the first cut side at a right angle with the groove-side part.

10. The attachment structure according to claim 9 wherein the opening of the opening part is defined by the first cut side of the first insert part and the first cut side of the second insert part having a triangular shape, a base portion of the triangular shape being located between the connection members.

\* \* \* \* \*